United States Patent
Hamman et al.

(10) Patent No.: US 9,495,234 B1
(45) Date of Patent: Nov. 15, 2016

(54) DETECTING ANOMALOUS BEHAVIOR BY DETERMINING CORRELATIONS

(71) Applicant: Amazon Technologies, Inc., Reno, NV (US)

(72) Inventors: Richard Alan Hamman, Cape Town (ZA); Matthew James Eddey, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 313 days.

(21) Appl. No.: 13/918,708

(22) Filed: Jun. 14, 2013

(51) Int. Cl.
*G06F 11/00* (2006.01)
*G06F 11/07* (2006.01)
*G06F 11/30* (2006.01)

(52) U.S. Cl.
CPC ........... *G06F 11/079* (2013.01); *G06F 11/301* (2013.01)

(58) Field of Classification Search
CPC ............... G06F 11/34; G06F 11/3466; G06F 11/1484; G06F 11/301
See application file for complete search history.

(56) References Cited

U.S. PATENT DOCUMENTS

| | | | |
|---|---|---|---|
| 2013/0097464 A1* | 4/2013 | Ahmad | G06F 9/45558 714/47.1 |
| 2014/0172371 A1* | 6/2014 | Zhu | G06F 11/0709 702/185 |
| 2014/0215049 A1* | 7/2014 | Provaznik | H04L 41/0663 709/224 |

\* cited by examiner

*Primary Examiner* — Bryce Bonzo
*Assistant Examiner* — India Davis
(74) *Attorney, Agent, or Firm* — Hogan Lovells US LLP

(57) ABSTRACT

Systems and methods for detecting anomalies within a multi-tenant environment are described. Diagnostic tests are performed on one or more components, such as host computing devices. The one or more components send resulting diagnostic information to an electronic device such as a monitoring component that processes the diagnostic information. The electronic device determines whether one or more properties, such as errors, are comprised within the one or more components. Based at least in part on properties that may be found, a correlation may be made between at least two properties.

20 Claims, 7 Drawing Sheets

| # | Error / Property 1 | Error / Property 2 | Error / Property 3 | ... | Correlation Strength |
|---|---|---|---|---|---|
| 1 | vm_user1 not launching new instances | unable to find HDD on vm_user1 | N/A | ... | 0.899 |
| 2 | vm_l33t_01 unable to launch software X | vm_l33t_03 unable to launch software Y | vm_l33t_00 unable to Launch software Z | ... | 0.650 |
| 3 | CPU running at maximum capacity | Host computing device crash | Software X failure | ... | 0.950 |

NOTIFICATION

Important Issues: — 510

| Host Name | Errors/Properties | Correlation Strength | Possible Solutions |
|---|---|---|---|
| vm_user1 | 1. Not launching new instances<br>2. Unable to find HDD | 0.899 | 1. Restart Host<br>2. Test HDD Driver |

520

530 — vm_user1 ; 240 ; 330

Other Issues: — 510

| Host Name | Errors/Properties | Correlation Strength | Possible Solutions |
|---|---|---|---|
| vm_l33t_01 and<br>vm_l33t_03 | 1. Not launching software X<br>2. Not launching software Y<br>3. Not launching software Z | 0.650 | 1. Restart Host<br>2. Uninstall and reinstall software Z on host vm_l33t_03 |

DETECTING ANOMALOUS BEHAVIOR BY DETERMINING CORRELATIONS

BACKGROUND

As an increasing number of applications and services are being made available over networks such as the Internet, an increasing number of content, application, and service providers are turning to technologies such as resource sharing, multi-tenant environments, and cloud computing. Such technologies can enable a user to obtain access to electronic resources through services, such as Web services, where the hardware and/or software used to support those services is dynamically scalable to meet the needs of the services at any given time. A user or customer typically will rent, lease, or otherwise pay for access to these resources, and thus does not have to purchase and maintain the hardware and/or software to provide access to these resources.

In at least some environments, a provider of these resources can be responsible for tasks such as upgrading and deploying software, as well as managing configuration information for the various resources. In some cases, errors can occur on these machines which may affect their ability to update information, deploy code, modify settings, or perform other activities with respect to the various resources. These errors are often costly for the provider of these resources.

BRIEF DESCRIPTION OF THE DRAWINGS

Various embodiments in accordance with the present disclosure will be described with reference to the drawings, in which:

FIG. 3 illustrates an example data structure that stores data associated with various embodiments, in accordance with various embodiments;

FIG. 5 illustrates an example notification, in accordance with various embodiments;

DETAILED DESCRIPTION

Figure 1:
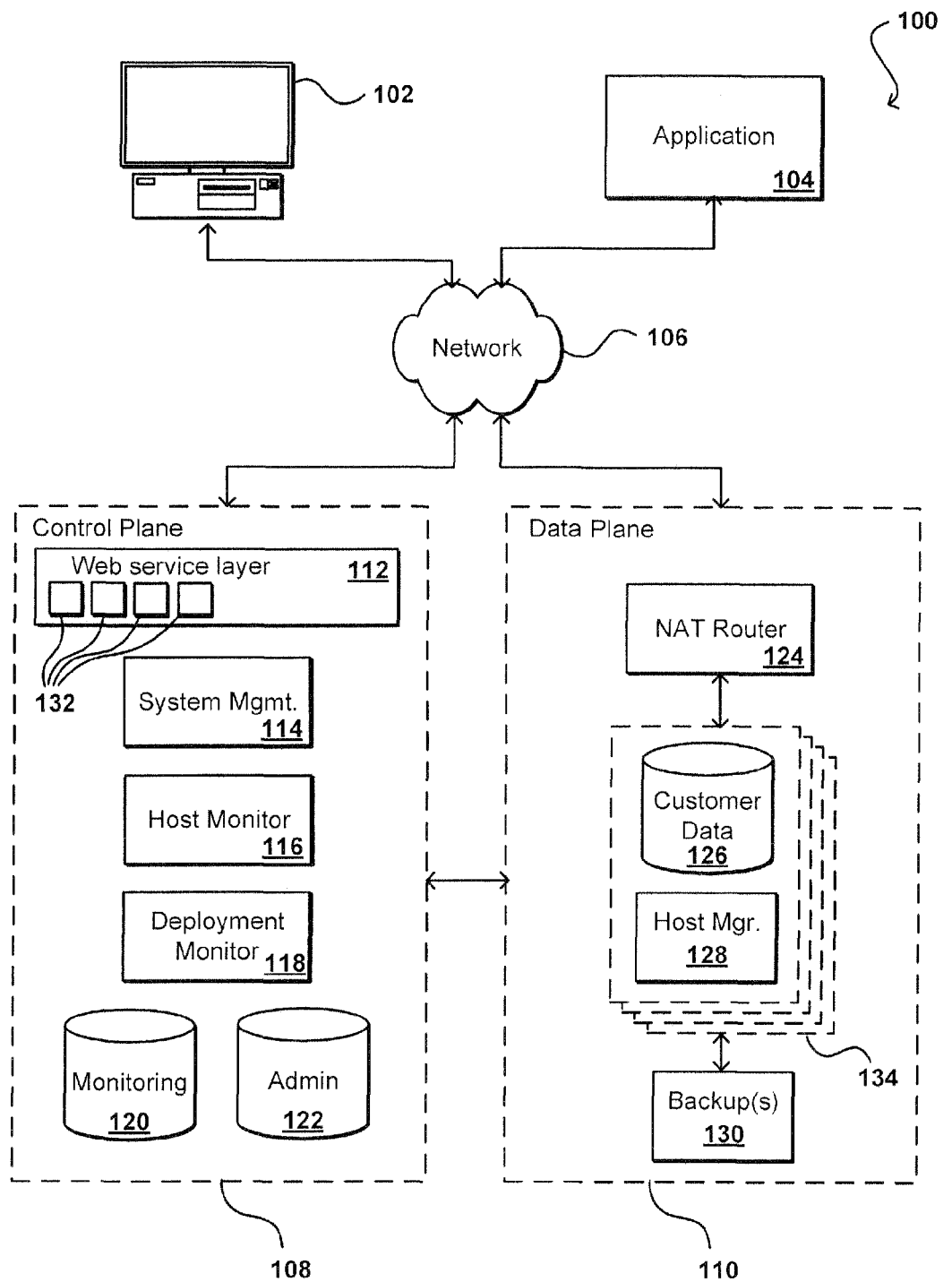
FIG. 1 illustrates an environment in which various embodiments can be implemented.

Systems and methods in accordance with various embodiments of the present disclosure may overcome one or more of the aforementioned and other deficiencies experienced in conventional approaches to detecting specific behaviors or issues across one or more computing devices. In particular, various embodiments use diagnostic information received from multiple host computing devices and/or components to identify anomalous behavior and/or error correlations, and at least some embodiments utilize this information to attempt to determine a cause of errors or anomalous behavior associated with at least a portion of those host computing devices. For example, by examining diagnostic data, a system can determine a subset of host computing devices with similar errors. By also determining similar properties associated with the host computing devices with similar errors, a root cause of the errors may be determined. Such a technique can assist a user, such as an engineer or technician, to investigate and find the cause of an error quicker than if the user were to run typical diagnostic tests on an individual host computing device. Sometimes, errors are opaque and difficult to find. In the various embodiments described herein, a user may view a summary of the properties that the host computing devices have in common and narrow in on the cause of an error.

It should be appreciated that herein, the term host computing device is used as an illustrative example. In other words, although the term host computing device is used throughout the instant disclosure, components such as hardware, software, and/or firmware may be used interchangeably with host computing devices. Moreover, diagnostic tests discussed herein are capable of testing host computing devices and components. Components may include, but are not limited to: software, hardware, firmware, circuits, hard disk drives, memory, networking devices, I/O devices, etc.

In various embodiments, a monitoring and/or diagnostic test system is implemented throughout a plurality of host computing devices. A diagnostic test system may test the host computing devices to gather information about properties and/or errors including, but not limited to: software errors, symptoms of errors, a time at which an error occurred, failures, features, specific behaviors, anomalous behaviors, types of software, software versions, software specifications, software errors, a time at which software was installed, types of hardware, hardware versions, hardware specifications, hardware errors, a time at which hardware was installed, network errors, network characteristics, diagnostic test failures, firmware, a frequency of errors, whether the errors are expected, an ambient error rate, degraded performance rates amongst resources, etc. In some embodiments, host computing devices with a known error may be tested such that diagnostic tests do not need to determine which host computing devices comprise that error.

The number of diagnostic tests run on the host computing devices can range from a few to hundreds or thousands (e.g., 1, 1, 10, 150, 1,000, etc.). Diagnostic tests may run for a particular period of time, or they may run for an indefinite period of time. As discussed above, the results of these tests can be broad, and may include, but are not limited to: passing, failing, a result in between passing and failing (e.g., degraded performance), a failure where the test was unable to run, the detection of an error, the detection of a property, etc.

Associating a property with an error, a property with a property, or an error with an error can be considered as types of association-rule learning. Association-rule learning is a technique that can determine items and/or processes that are associated with one another. As a general example, association-rule algorithms take the form shown in Equation 1, where when items $A_i$ appear, items $B_i$ also appear with a certain probability:

$$\{A_1, A_2, \ldots, A_n\} \rightarrow \{B_1, B_2, \ldots, B_m\} \quad \text{Equation 1}$$

Similarly, with reference to example embodiments described herein, the rule:

$$\{\text{Property X, Property Y}\} \rightarrow \{\text{Host Computing Device Failure}\} \quad \text{Equation 2}$$

may indicate that if Property X and Property Y are present on the same host computing device, that host computing device will fail.

These associations may be predetermined or determined in real time. It should be appreciated that associations are also referred to as correlations and/or rules herein, and that these terms may be used interchangeably. Further, in various examples described herein, correlations can be associated with a correlation strength. A correlation strength, also referred to as a correlation coefficient, can be a measure of the confidence of a correlation (e.g., whether the properties and/or errors are actually correlated) and/or an adjusted correlation measure that can include any of a number of weightings or adjustments of the calculated correlation. A correlation strength can assist with indicating characteristics of a correlation such as the likelihood that two errors are correlated, the statistical probability that the correlated errors will cause a host computing device to fail, the amount of time between two correlated events, etc.

Various other applications, processes and uses are presented below with respect to the various embodiments.

FIG. 1 illustrates an example of an electronic resource environment 100 that can be used in accordance with various embodiments. An electronic resource environment 100 may also be referred to as a multi-tenant environment. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane, in various embodiments, may also analyze correlations to instantiate or reboot customer instances. In another embodiment, a correlation analysis may be used to perform initial instance placement. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

The control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of host computing devices (including machines), or a Web service, among other such options. When a type of host computing device known as a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to one or more central processing units (CPUs), memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get status or diagnostic information 230 (e.g., 230a, 230b, 230c, 230d, 230e, and 230f of FIG. 2) of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 110 through the network using a Java Database Connectivity (JDBC) or other such client to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

Figure 2:
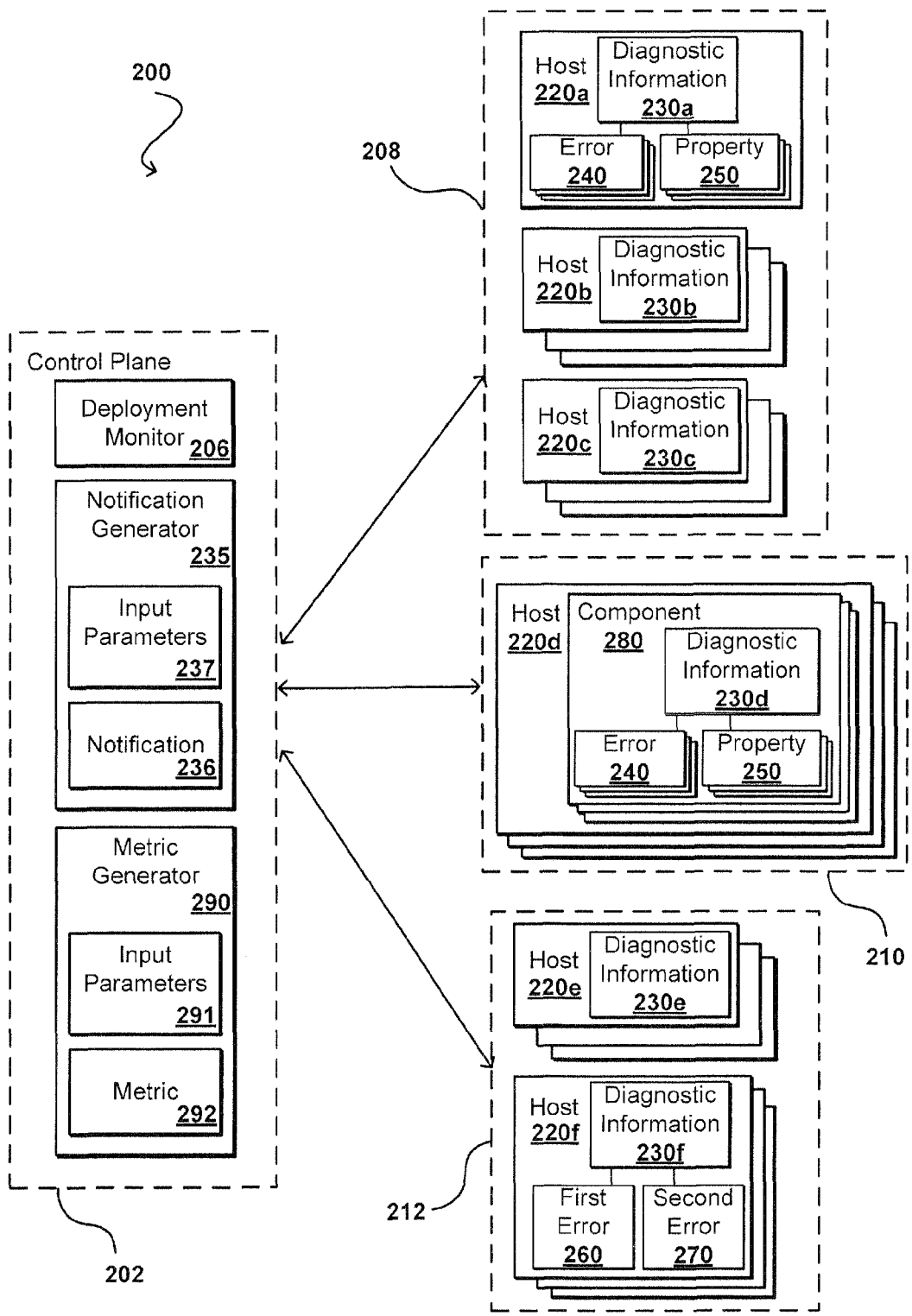
FIG. 2 illustrates an example block diagram of a system, in accordance with various embodiments.

FIG. 2 illustrates a view 200 of a portion of an environment such as that illustrated in FIG. 1. In this example, there are multiple groups of host computing devices 220 (e.g., 220a, 220b, 220c, 220d, 220e, and 220f) or other such resources, where at least some of those groups can be separated logically and/or geographically. For example, one group 208 of host computing devices can correspond to a data center located in a first location, while other groups 210, 212 correspond to host computing devices located in other regions or areas. Within a given group 208, there can be host computing devices of different types 220a, 220b, 220c that can communicate with each other in at least some situations or under certain conditions. A "type" of host computing device might correspond to a physical type or configuration, or can correspond to an intended use or allocation of a host computing device, among other such options. In some embodiments, host computing devices of one group 208 might communicate with host computing devices of at least one other group 210, 212 for specific purposes and/or at specific times. Further, configuration or software updates or deployments might be made across groups, one group at a time, or at another determined rate.

In various embodiments, in addition to host computing devices, the multi-tenant environment comprises component(s) 280 which may be tested in a similar manner as a host computing device. In some embodiments, a multi-tenant environment refers to an environment where multiple users or customers can concurrently share resources, such as host machines, servers, or databases. Various management software can be utilized to virtually partition resources, data, and/or configurations, such that each customer can connect to a different virtual application instance or virtual machine, even though several of those might be hosted on a single machine. Further, the workload for a customer might be spread across multiple machines, each capable of performing work for at least one other customer. As discussed above, for illustrative purposes, diagnostic testing as discussed herein is performed on host computing devices. However, it should be understood that diagnostic testing may be performed on components comprised within or external from a host computing device. Components may include, but are not limited to: host computing devices, hand held electronic devices, edge devices, hardware, software, firmware, operating systems, hard disk drives, memory, random access memory, blades, virtual machine instances, etc. As with host computing devices discussed herein, components may also comprise errors, properties, symptoms of errors, etc.

As illustrated, one or more components in a control plane 202 environment (e.g., a deployment monitor 206) can be configured to monitor properties 250 and/or gather diagnostic information 230 related to the various components, host computing devices, and/or groups. In addition, in various embodiments, a deployment monitor can operate with a deployment service that manages the instatement of new software on host computing devices. In various embodiments, properties and/or errors are monitored within a single group or across two or more groups (e.g., diagnostic information may be send from all host computing devices or a subset of the host computing devices). The monitoring may be continuous or periodic. The diagnostic information can include any monitorable behavior that can occur within such a networked, multi-tenant, and/or shared resource environment. This can include, for example, configuration changes, deployments, communications, network flow, errors, properties, failures, and the like. Further, this can include diagnostic information related to hardware native to host computing devices. This hardware may include, but is not limited to: memory devices, processors, I/O devices, etc. In various embodiments, a host computing device can emit records indicating information such as CPU usage, memory usage, customer IDs of instances on a host computing device, error logs, etc. In various embodiments, a host computing device can provide information related to customer instances running on a host such as the customer ID, the virtual appliance (e.g., machine image) used to instantiate a virtual machine, an instance type, etc. The amount of data within the records (e.g., diagnostic information) that the various host computing devices emit can be very large.

In some embodiments, a metric generator 290 is implemented within a control plane. A metric generator 290 may utilize one or more input parameters 291 and one or more metrics 292, for example. A metric generator, in one embodiment, can monitor various errors, properties, and/or correlations over time. In an embodiment, a metric generator can perform trend analyses on various correlations (or errors, properties, etc.), upon which a different correlation may be based at least in part on. For instance, if an adjustment is made, and then a correlation strength decreases over time as indicated by the metric generator, the decrease in the correlation strength may indicate that the decrease was due to the adjustment. As another example, if an adjustment is made and the correlation strength does not decrease over time as expected, the absence of a decrease in the correlation strength may indicate that other problems exist, or possibly that new problems are emerging. In some embodiments, diagnostic information may be retrieved from the control plane. As an example, logs (e.g., access logs) generated by the control plane may be used to map metrics to events that occurred on host computing devices. Further, as will be discussed below, in some embodiments, a notification 236 is generated (e.g., by a notification generator 235) when a particular property, error or metric is found and/or determined.

As discussed herein, in various embodiments control plane systems are capable of emitting diagnostic information following the occurrence of an event, such as an error or a property/metric that indicates that a service level agreement (SLA) has been breached. In some embodiments, data may be stored in logs which may be distributed across a fleet of host computing devices. Thus, in some embodiments, correlations may be determined in parallel, whether in real time, in intervals, upon command, etc. For example, triggering an alarm, or providing a notification, may be performed in real time, every minute, every 5 minutes, every hour, etc.

There are many types of correlations 320 (of FIG. 3). Correlations may exist on a single host computing device such as host 220a, or be found within multiple host computing devices such as hosts 220b and 220f. Determining whether errors and/or properties are correlated may be performed in a variety of ways. For example, a monitoring component may be programmed prior to diagnostic testing to include information indicative of relationships between errors and/or properties. Knowing what errors and/or properties are correlated prior to diagnosing errors may save processing time or resources in general. Further, if correlated errors and/or properties are associated with a solution (e.g., 520 of FIG. 5), storing data associated with what errors and/or properties are correlated prior to diagnosing errors may allow the multi-tenant environment to assist a user with determining possible solutions 420 to correct error(s) via an interface such as a console or an application program interface.

Correlations 320 may assist users with, for example, determining the cause of errors in a fleet of host computing devices. As another example, correlations may assist users with predicting the likelihood of other errors, failures, anomalous behaviors, specific behaviors, etc. To describe how errors are correlated, first ambient errors should be described. Ambient errors are errors in a host computing device, component, or environment that are common and/or expected. Ambient errors typically do not require the attention of a user when attempting to diagnose a problem with a host computing device. Moreover, host computing devices typically have an ambient error rate. In other words, host computing devices have a rate at which errors are expected to occur. In some embodiments, correlations 320 are any combination or permutation of properties that cause errors to occur more frequently than the ambient error rate.

In some embodiments, determining whether errors and/or properties are correlated is performed after diagnostic testing begins. For example, a diagnostic test may run and discover that a particular set of host computing devices are not working correctly, and that they all have the same error(s). As examples, diagnostic tests may include, but are not limited to: identifying the host computing devices (or a subset thereof) within a multi-tenant environment, determining properties and/or errors on host computing devices, determining the times that properties and/or errors occurred on host computing devices, determining an ambient error rate of a host computing device, determining the availability of resources on a given host computing device, determining whether a host computing device is operating properly, determining whether a host computing device comprises a particular component, retrieving an error log associated with a host computing device, etc.

In an embodiment, correlation derived from diagnostic information may indicate that a set of host computing devices with one error all have the same faulty piece of hardware. For example, if a set of host computing devices are all unable to launch an instance of a virtual machine, and diagnostic information indicates that 100% of these host computing devices are unable to access a particular portion of their memories, then a user may realize that the faulty memory is causing the inability to launch an instance of a virtual machine. In another example, this time involving more than two correlated errors and/or properties, a first piece of software may fail along with two other pieces of software. In this example, determining that three errors are correlated may be advantageous because, while the first error may be caused by the second error, the cause of the second error may not be apparent unless the third error is displayed. In another example, two pieces of software may have failed and metrics from the computer system may indicate the amount of memory on the computer system as well as how much memory was free at the time the software failed. Having these three properties may assist a user by indicating that the first piece of software is not running because the second piece of software is not running, and that the second piece of software is not running because the memory is being used by processes other than the first and second pieces of software. Of course, more than three properties and/or errors may be utilized to determine correlations.

FIG. 3 illustrates an example data structure 310 used for storing descriptions of correlations 320 (e.g., correlated properties and/or errors), and a correlation strength 330 of the correlations 320. For the sake of convenience, various methods, systems and algorithms used to determine a correlation strength will be discussed below. A correlation can be stored (e.g., in data structure 310) such that the various components described herein can determine that particular type of error in the future without having to create a new correlation. Correlations may be stored in a table (e.g., an association-rule table), database, or some other data structure 310 fit for storing correlated errors or other types of rules in a multi-tenant environment. It should be appreciated that the ellipses in the fifth column of the example data structure in FIG. 3 indicate that more than three properties and/or errors may be correlated (e.g., 4, 5, 6, 10, 20, or more).

One example of an error is referred to as "no launches." A "no launches" error refers to the situation where new instances are prevented from being created on a host computing device. This results in a waste of resources or, at least, an increased amount of time from when a customer launches an instance to when it's available because a new host computing device needs to be selected. In one example of a correlation algorithm (i.e., a method of determining correlations and/or correlation strength), diagnostic information may be provided indicating that a "no launches" error occurs on a particular percentage (e.g., 90%) of host computing devices that have a particular type of hardware failure. Such diagnostic information may be indicative of a correlation. Namely, that the "no launches" error is related in some way to the faulty hardware. By knowing this correlation, a user may spend less time searching for the cause of the "no launches" error. It should be appreciated that a "no launches" error may be caused by factors other than hardware, such as a faulty launch configuration, block device mappings that are not supported on an instance, an invalid instance type, etc.

In one embodiment, as briefly discussed above, a metric generator may indicate emerging causes of errors or emerging correlations. For example, a metric generator may indicate that a correlation strength is becoming stronger, or that it is becoming weaker. For instance, when a property on a machine is adjusted, and a metric generator may indicate that various correlation strengths become weaker, the metric generator may also indicate that the adjusted property is the cause of the correlation strength becoming weaker. In one example, if a hardware failure remains the same or decreases, a metric generator could be used to indicate that there is a new case of "no launches" that a user or an environment (e.g., a data structure or table) is unaware of.

Correlated error detection may assist with determining the cause of software problems as well. For example, after a first software product is upgraded some of the host computing devices that run the upgraded first software product begin to fail or show degraded performance. Diagnostic information, including log information and/or version information, may be utilized to create a correlation that indicates that host computing devices that have a particular version of a second software product installed are primarily the host computing devices that fail or produce errors, while host computing devices without the second software product rarely fail, if at all, when the first software product is upgraded. By selecting the subset of host computing devices that have upgraded the first software program, diagnostic information from the subset may assist with determining a correlation indicating that only the host computing devices with the second software program installed are the host computing devices that are failing. Furthermore, the correlation may indicate that the host computing devices where the first software product was upgraded prior to the second software product being installed are not failing. Thus, a solution to the error can be found, such as to upgrade the first software product before installing the second software product.

When correlations are found an action may occur, such as sending an alert or generating a notification. The action that occurs may be based upon a correlation strength. An action may occur when a correlation strength exceeds a particular threshold (or value). For instance, a value of a correlation strength could be indicative of a likelihood of a property being a cause of an error. Due to that value, a notification can be sent to a user indicating that the property is likely causing, or not causing, that error. In some embodiments, the correlation strength indicates the importance of the correlations. For example, if errors are consuming a large amount of resources within the multi-tenant environment the correlation strength may be high. As another example, if additional host computing devices are likely to fail in the future due to the correlations, the correlation strength between those correlations may be high. As yet another example, if a correlation strength is high, an action is more likely to occur, but if the correlation strength is low, there is a lower probability that an action will occur. In some cases, correlations are given a correlation strength based at least in part on the amount of computational resources available on a given host computing device or within a multi-tenant environment.

Figure 4:
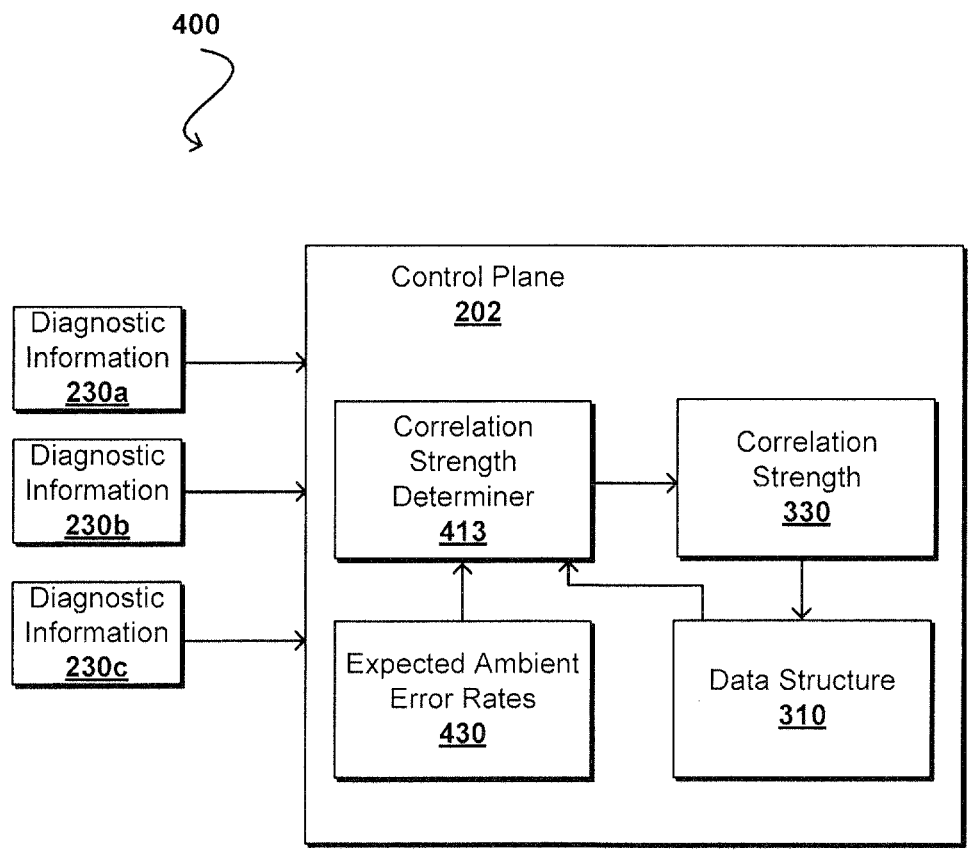
FIG. 4 illustrates an example block diagram of a system that determines a correlation strength, in accordance with at least one embodiment.

A correlation strength may be determined in a variety of ways. In some embodiments, a correlation algorithm is used to determine a correlation strength, which may be referred to as a correlation coefficient in some embodiments. For example, as shown in the system 400 shown in FIG. 4, a correlation strength 330 can be determined based at least in part on the statistical probability that a host computing device would randomly contain the correlation(s) (i.e., whether the errors and/or properties are ambient). To illustrate this example, FIG. 4 shows a correlation strength determiner 413 that, in some embodiments, is operable to gather diagnostic information 230 from one or more host computing devices. The diagnostic information can be compared with an expected and/or predicted ambient error rate 430 to determine if the errors and/or properties included in the diagnostic information occur more or less often than the expected ambient error rate. In some embodiments, diagnostic information may include expected ambient error rates. It should be appreciated by those skilled in the art that although a correlation strength determiner is shown, a correlation strength determiner could be any component in a control plane including a deployment monitor, a metric generator, an API, a notification generator, etc.

In various embodiments, correlation algorithms can be used to determine a correlation strength using components shown in FIGS. 1, 2, 3 and 4 (e.g., the correlation strength determiner 413 of FIG. 4). In various embodiments, metrics and/or error logs may be mapped to properties and/or errors and used to quantify the relationships between the two. In some embodiments, the amount that one property and/or error depends on another property and/or error may be used to determine a correlation strength. To perform this analysis, and other analyses discussed herein, algorithms such as Apriori may be utilized. As known to those skilled in the art, Apriori uses a breadth-first search strategy to count the support (e.g., correlation strength) of itemsets and uses a candidate generation function which exploits the downward closure property of support to prune unneeded itemsets (e.g., items that would not cause a notification and/or alarm). For example, a correlation strength may be determined based at least in part on the fraction of host computing devices that contain the error or property X and the error or property Y in the set of host computing devices that contain the error or property X. In other words, in some embodiments, $$\text{Correlation Strength} = \frac{\text{Host Computing Devices comprising } X \text{ and } Y}{\text{Host Computing Devices comprising } X} \quad \text{Equation 3}$$

In an embodiment, an error or property (e.g., metrics breaching a threshold, an error occurring in a control plane component, etc.) may be converted into a discrete item (e.g., X or Y). In some embodiments, this mapping between an event (e.g., an error or property) and a discrete item may be manually defined.

In some embodiments, a continuous formulation of various correlation strengths may be implemented. In some examples, algorithms that use Spearman's rank correlation coefficient or Pearson's correlation coefficient may be utilized (e.g., a Spearman correlation or a Pearson correlation may be used to determine a correlation strength). For example, if a subset of a set of host computing devices are unable to launch new instances, and the configuration of memory within the subset of host computing devices is shown to change the number of host computing devices that are able to launch new instances, it is likely that the configuration of the memory is correlated to the ability of a host computing device to launch new instances. A Spearman correlation can be used to calculate a correlation strength between the configuration of memory and the host computing devices that do not launch new instances. The Spearman correlation measures the extent to which, as one variable increases, the other tends to increase or decrease, regardless of whether a linear relationship exists. For the example discussed above, the Spearman correlation may indicate a high correlation strength if, as the memory configuration across the set changes, almost every host computing device in the set is able to launch new instances. It should be appreciated that a Pearson correlation may also be used to determine a correlation strength, although the correlation would be linear between the configuration of the memory and the amount of host computing devices that can launch new instances.

In some embodiments, if an error or property is known to be present on 90% of host computing devices, it may not be a good candidate to use for a correlation because it is so common. If an error or property is known to be present on 5% of host computing devices, it may be a better candidate to use for a correlation. Of course, the threshold for determining whether a correlation should exist, or cause an action to be performed, may be adjusted. This adjustment may be performed automatically or manually. This adjustment may be based at least in part on the history of the host computing device(s). In some embodiments, if an error or property is not an ambient error or property, it is more likely to be determined to be a correlation. In some embodiments, when two or more errors and/or properties occur concurrently or simultaneously, they may be determined to be correlated.

In some embodiments, a correlation strength is based at least in part on the time at which the errors occurred. With continued reference to FIG. 4, as an example, diagnostic information 230 may include a time at which an error and/or property occurred. That time is then delivered to correlation strength determiner 413. In various embodiments, correlation strength determiner 413 determines a correlation based on a time included in diagnostic information 230 and produces a correlation strength 330. In some embodiments, a rule may exist dictating that errors and/or properties are correlated if they occur in a particular chronological order. In some cases, this rule may be added automatically (e.g., added to a data structure 310 that stores correlations). For example, diagnostic information may show that when two particular errors and/or properties occur in a particular order, a third error occurs. In some cases, an action may then be taken to prevent the third error from occurring. As another example, errors and/or properties may be determined to be correlated if they occur during the same period of time.

In some embodiments, a correlation strength is based at least in part on whether the correlations were already stored in the monitoring component(s) and/or data structure 310. In such a case, for example, the data structure 310 may provide stored correlations 320 to a correlation strength determiner 413. In one embodiment, if a correlation is entered into a data structure 310 (e.g., an association-rule table or database) prior to monitoring for correlated errors, a finding of that correlation may have a high correlation strength. Similarly, as discussed above, if a correlation is added to the data structure after the diagnostic testing has begun, that correlation may have a high correlation strength when added to the data structure and/or when found again. Whether a correlation that is found more than once is associated with a high correlation strength may depend on how many times that correlation is found. For example, if the same correlations are found on most host computing devices, the strength of the correlation between those errors may be weak or strong depending on the particular circumstance (e.g., a setting created by a user).

In some embodiments, if one error 260 causes another error 270, for example, then errors 260 and 270 are considered correlated and may receive a particular correlation strength 330 because one error causes the other.

Once diagnostic information is collected and correlations are determined, the control plane 108 is operable to send a notification 236 to a user. Notifications 236 may be sent and/or presented to a user in a variety of ways. Moreover, notifications 236 may comprise a variety of information. In some embodiments described herein, notifications 236 are generated by a notification generator 235.

FIG. 5 illustrates and example notification 236. In an embodiment, notifications are sent to a user. A notification may comprise a plurality of sections 510. A notification may include information such as, but not limited to: errors, properties, correlations, symptoms of errors, host computing device identifiers 530, diagnostic information, important issues, other issues, correlation strengths 330, warnings regarding possible future errors, possible causes of errors, solutions indicating how to repair errors 520, multi-tenant environment information, etc. Notifications may contain information regarding why two errors and/or properties are correlated, which may help a user determine the cause of an error. It should be appreciated that notifications may comprise information associated with all host computing devices within a fleet of host computing devices, or at least a subset thereof.

Notifications may be sent to a user in a variety of ways. In some embodiments, notifications are generated and sent to users through email. Email notifications may be sent in predetermined intervals (e.g., hourly, daily, monthly) or upon request by a user. In other embodiments, notifications may be generated and viewed when a user accesses a web portal and/or a management tool. It should be appreciated by those of skill in the art that merely because a notification is generated, a notification does not necessarily need to be sent. In one embodiment, a notification may be generated when demanded to do so, such as when a user signs into a web portal, for example. Regardless of how or when a notification is generated, notifications can be sent to users in a number of other ways including, but not limited to: text message, instant message, via a program running on the machine of a user, etc. In some cases, a notification may be sent to a user immediately when a particular type of correlation is found. For instance, if particular correlation is known to cause failures, a notification may be sent to a user without waiting for a scheduled time to send the notification.

In various embodiments, input parameters 237 are used to create a notification 236. For example, a notification 236 may require information including, but not limited to: host computing device identification 530, component identifiers 530, a number of host computing devices, the amount of host computing devices in a subset, the number of subsets, a strength of correlations 330, a type of error, the types of errors, types of properties, diagnostic information, a correlated error, etc. In one example, once correlated errors are identified, they may be sent to notification generator 235, which in turn produces notification 236. In various embodiments notification generator 235 requires input parameters 237 to generate notification 236.

Figure 6:
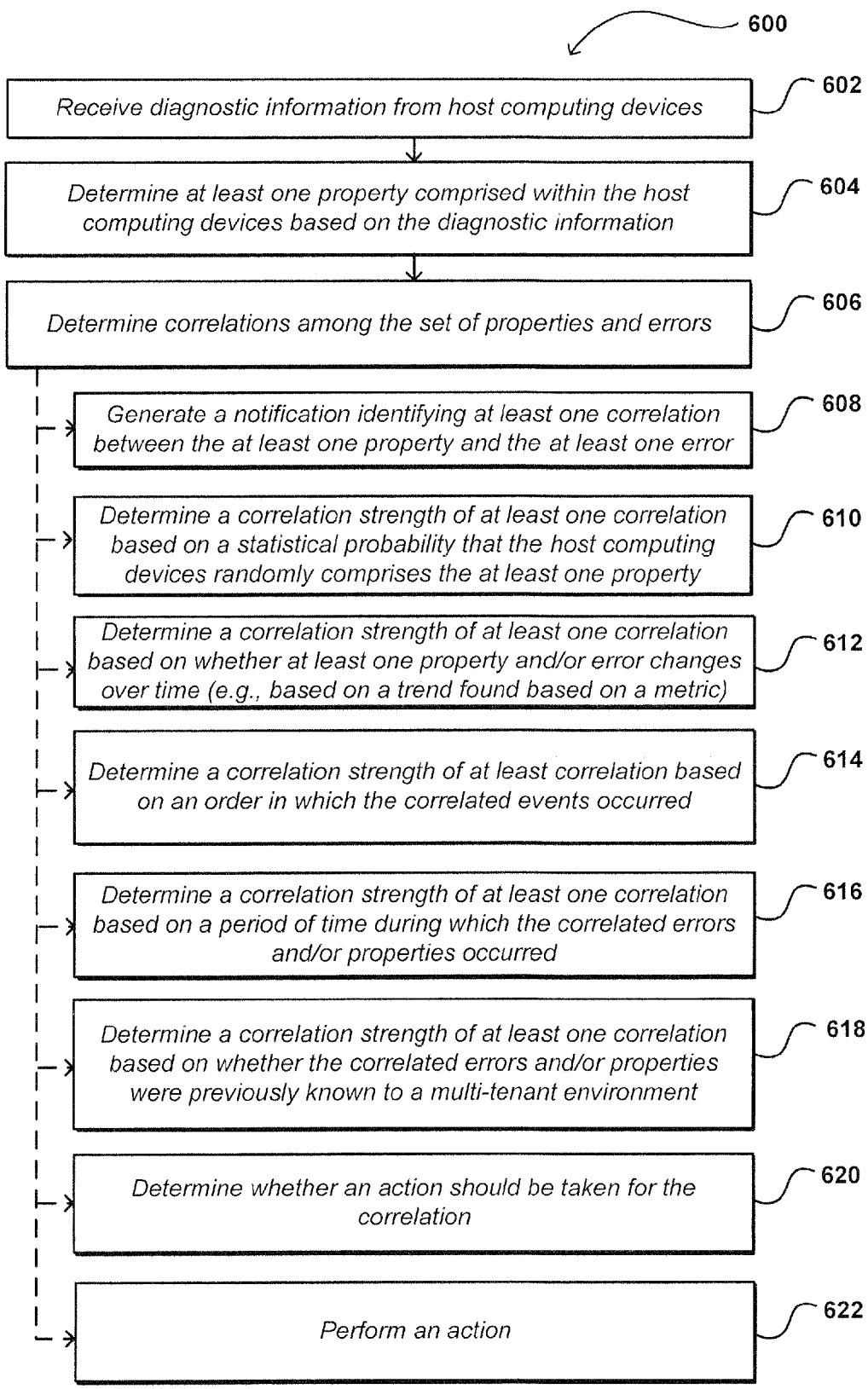
FIG. 6 illustrates an example flow diagram, in accordance with various embodiments.

FIG. 6 illustrates an example flow diagram 600 for determining correlations in a multi-tenant environment. It should be understood that for this and other processes discussed herein that there can be additional, fewer, or alternative steps performed in similar or alternative orders, or at least partially in parallel, within the scope of the various embodiments unless otherwise stated. For example, it should be appreciated that while flow diagram 600 shows that steps 602, 604, and 606 are each performed, in accordance with one embodiment, steps 608, 610, 612, 614, 616, and 618, each describe steps that may, or may not, be performed in any order, in accordance with one embodiment. In other words, flow diagram 500 is meant to be an illustrative example of how determining correlations in a multi-tenant environment could be performed, and should not be construed as being anything other than an example.

In this example, diagnostic information is received 602 from a set of host computing devices, wherein each of the host computing devices comprises one or more errors. Diagnostic information may be sent by any component and/or host computing device, such as machines and virtual machines. Diagnostic information may be sent to an appropriate component (e.g., a monitoring component) of the control plane automatically, or upon request by the monitoring component(s) and/or other component(s) within the control plane, for example. Diagnostic information may include, but is not limited to: properties of a host computing device, available resources, hardware information, software information, errors, failures, symptoms of errors, device history, error logs, software logs, etc. In some embodiments, a first subset of host computing devices may be any number of host computing devices. For example, a first subset of host computing devices may include all host computing devices capable of sending diagnostic information. In another example, a first subset of host computing devices may comprise all host computing devices with a particular error. In some embodiments, a second subset of host computing devices within the multi-tenant environment may be determined that comprise at least one or more error and/or one or more property based on the diagnostic information. For example, once correlations are found, the host computing devices with those correlations comprise the second subset of host computing devices.

With continued reference to FIG. 6, one or more properties and one or more errors (or other anomalous behaviors) associated with the one or more host computing devices are determined 604 based at least in part on the diagnostic information. Moreover, correlations among the set of properties and errors are determined 606. For example, a correlation among the set of properties and errors could refer to a correlation between: (1) errors and errors; (2) properties and properties; (3) properties and errors; or (4) any combination of properties and errors when more than two properties or errors are present. As discussed above, different techniques may be used to determine whether errors and/or properties are correlated. For instance, determining whether errors and/or properties are correlated may comprise steps including, but not limited to: comparing the probability of an error and/or property being ambient error versus the probability that the error and/or property is not ambient, determining whether the error and/or property is one that the monitoring component(s) have recognized before, determining whether the indicators of an error and/or property are changing over time (e.g., analyzing trends with a metric generator), determining whether the error itself changes overtime (e.g., analyzing trends associated with an error using a metric generator), etc. As discussed above, these determinations may be performed by a control plane and/or components as shown in FIG. 4.

In some embodiments, a notification is generated 608 identifying at least one of the one or more correlations between the one or more properties and the one or more errors. Different types of notifications may be provided based at least in part on the type of correlation(s) found. For instance, if the correlations indicate that a number of host computing devices are about to go offline, the notification may be sent as an important email, or it may be sent to a particular group of people. As another example, when a user signs into a web portal that shows the discovered correlations, or a subset thereof, more important errors may be shown first, or highlighted in some manner.

In various embodiments, a correlation strength is determined (using at least one of the listed determining approaches 610, 612, 614, 616, and 618) for at least a portion of the correlations. A correlation strength 330 may be a measurement. In some cases, a correlation strength between the at least two correlated errors and/or properties is a measurement of the closeness of the relationship of the plurality of errors and/or properties. In some cases, the correlation strength may be related to the amount of damage the correlations may cause to a host computing device or customer instances running in a multi-tenant environment. For instance, if a correlation is known to cause a system failure, or the destruction of a machine (e.g., overheating, etc.) then that correlation may have a higher correlation strength (i.e., correlation coefficient) than a correlation that merely prevents an application from running, for example. It should be understood that a correlation strength can be determined by one or more factors. In various examples, a correlation strength is determined by factors including, but not limited to: a statistical probability that an error occurs on a host computing device, a period of time in which two errors occur, the order in which two properties occur, whether an error is known to a control plane or table, whether a metric indicates a trend associated with a correlation, or a combination of the aforementioned factors, etc.

With continued reference to FIG. 6, in one embodiment, a correlation strength of at least one or more correlations is determined 610 based at least in part on a statistical probability that the one or more host computing devices randomly comprises the one or more properties. For instance, the errors and/or properties found on host computing devices may appear more frequently than ambient errors. As such, these errors and/or properties may be determined to be correlated. In another embodiment, a correlation strength of at least one or more correlations is determined 612 based at least in part on whether one or more properties change over a period of time. For instance, a property may be considered an ambient error because it does not occur with much frequency. However, if that ambient error begins occurring more frequently, it may be become correlated with an error and/or property that is also increasing in frequency. In another embodiment, a correlation strength of at least one or more correlations is determined 614 based at least in part on an order in which one or more errors and one or more properties occurred. For example, if one error occurs after a property occurs (e.g., a piece of software is installed), then the property may be indicative of the cause of the error, and thus the property and the error can be considered correlated with one another. In another embodiment, a correlation strength of at least one or more correlations is determined 616 based at least in part on a period of time during which the one or more errors and the one or more properties occurred. For instance, if the errors occurred at a particular time of day, or when a particular set of users where using the host computing devices, an error may be determined to be correlated. Moreover, in various embodiments, the time of day may be associated with the correlation strength of the correlation. For example, if the correlation occurred during a time when scheduled system maintenance is being performed, the correlation may have a lower correlation strength since the scheduled system maintenance may have caused any errors. In yet another embodiment, a correlation strength of at least one or more correlations is determined 618 based at least in part on whether the one or more errors and the one or more properties were previously known to a multi-tenant environment (e.g., the electronic resource environment and/or data structure). For instance, if data structure is an association-rule table, and a new correlation is found, the new correlation is added to the association-rule table and a particular correlation strength is assigned to that correlation. However, if the correlation is already comprised within the association-rule table, it may receive a higher or a lower correlation strength because the correlation was already comprised within the association-rule table. Further, in one embodiment, whether an action should be taken for the correlation is determined 620. For example, if the correlation strength exceeds a particular threshold or value, an action may be performed 622 such as sending an alert or recording the correlation in a log.

Figure 7:
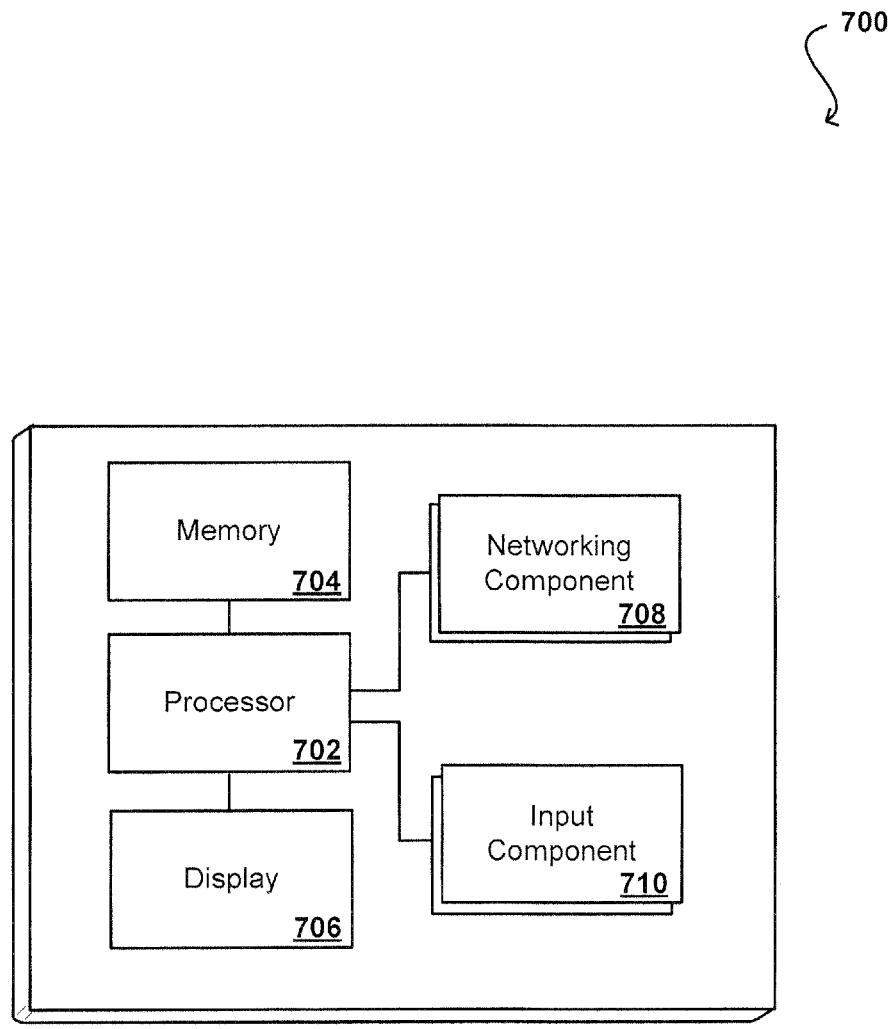
FIG. 7 illustrates a configuration of components of an example computing device that can be used in accordance with various embodiments.

FIG. 7 illustrates an example set of basic components of a computing device 700, such as the electronic resource environment 100 described with respect to FIG. 1. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device in some embodiments will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device can include one or more networking components 708 enabling the computing device to communicate over one or more networks, whether wired and/or wireless. The example device can also include at least one additional input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit, at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network I/O devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing instructions for identifying correlated errors in a multi-tenant environment, the instructions when executed by a computer system including one or more processors causing the computer system to:
   perform one or more diagnostic tests on a set of virtual machines in the multi-tenant environment, a first subset of the set of virtual machines demonstrating a first error;
   receive diagnostic information resulting from the one or more diagnostic tests performed on the set of virtual machines, the diagnostic information indicating a second error detected in at least a second subset of the set of virtual machines, the diagnostic information including first properties of the first subset of the set of virtual machines associated with the first error and second properties of the second subset of virtual machines associated with the second error;
   generate installation information relating to the first subset of the set of virtual machines and the second subset of the set of virtual machines, the installation information comprising versions of software installed on the first subset and the second subset of the set of virtual machines;
   determine a correlation strength between the first error and the second error, the correlation strength based at least in part on a statistical probability that a virtual machine comprised within the first subset of the set of virtual machines has the second error; and
   in response to the correlation strength exceeding a threshold, determine, based at least in part on the installation information and the diagnostic information, at least one modification to be made to the first subset, the at least one modification relating to at least one of the first properties, the second properties, or the software installed on the first subset.

2. The non-transitory computer readable storage medium of claim 1, wherein the instructions further cause the processor to:
   determine a first time of the first error and a second time of the second error, the correlations strength being further determined based at least in part upon a difference between the first time and the second time.

3. The non-transitory computer readable storage medium of claim 1, wherein the instructions further cause the processor to:
   generate a notification to a user of the one or more virtual machines, the notification identifying the first error, the second error, the correlation value, and the correlation strength.

4. A computing system, comprising:
   one or more processors; and
   a memory device including instructions that, when executed by the one or more processors, cause the computing system to:
   receive diagnostic information, the diagnostic information including data for one or more properties or one or more errors detected on at least one component of a set of resource instances in a multi-tenant environment;
   generate, based at least in part on the diagnostic information, installation information associated with the at least one component of the set of resource instances, the installation information comprising versions of software installed on the at least one component of the set of resource instances;

determine, based at least in part on the diagnostic information, at least a portion of the one or more properties of the at least one component correlated with the one or more errors detected on the at least one component;

determine at least one correlation strength of the at least the portion of the one or more properties correlated with the one or more errors detected on the at least one component based at least in part on the diagnostic information, the at least one correlation strength being indicative of a likelihood of at least one of the one or more properties being a cause of at least one of the one or more errors; and in response to the at least one correlation strength exceeding a threshold, determine, based at least in part on the installation information and the diagnostic information, at least one modification to be made to the at least one component, the at least one modification relating to at least one of the one or more properties or the software installed on the at least one component of the set of resource instances.

5. The computing system of claim 4, wherein the memory device further includes instructions that, when executed by the one or more processors, cause the system to:

generate a notification to a user of the at least one component, the notification identifying the at least a portion of the one or more properties correlated with the one or more errors based at least in part on the at least one correlation strength exceeding the threshold.

6. The computing system of claim 4, wherein the memory device further includes instructions that, when executed by the one or more processors, cause the system to:

send a notification to a user of the at least one component, the notification based at least in part on the correlation strength between the at least a portion of the one or more properties associated with the one or more errors, the notification identifying the modification to the software to reduce the likelihood of the one or more errors.

7. The computing system of claim 6, wherein the notification is generated based at least in part on one or more input parameters, the one or more input parameters including at least one of:

component identifiers, properties, errors, and diagnostic information.

8. The computing system of claim 4, wherein the one or more properties include at least one of:

symptoms of errors, a time at which an error occurred, features, types of software, software versions, software specifications, a time at which software was installed on a host computing device, types of hardware, hardware versions, hardware specifications, a time at which hardware was installed on a host computing device, diagnostic test failures, type of firmware, firmware versions, firmware specifications, and a time at which firmware was installed on a host computing device.

9. The computing system of claim 4, wherein the one or more components include at least one of:

host computing devices, hardware, software, operating systems, hard disk drives, network infrastructure, virtual machines, or memory.

10. The computing system of claim 4, wherein the correlation strength between the at least a portion of the one or more properties or the one or more errors is based at least in part on a statistical probability that the at least one component of the set of resource instances has the at least a portion of the two or more of properties or the one or more errors.

11. The computing system of claim 4, wherein the correlation strength of the at least a portion of the one or more properties correlated with the one or more errors is based at least in part on an order in which at least a portion of the one or more errors occurred.

12. The computing system of claim 4, wherein the correlation strength of the at least a portion of the one or more properties correlated with the one or more errors is based at least in part on a period of time during which at least a portion of the one or more errors occurred.

13. The computing system of claim 4, wherein the correlation strength between the at least a portion of the one or more properties or the one or more errors is based at least in part on whether the at least a portion of the two or more of properties or errors were previously indicated in the multi-tenant environment as being correlated.

14. A computer implemented method, comprising:

receiving, by one or more computer systems, diagnostic information from one or more host computing devices, the one or more host computing devices each demonstrating one or more errors, the diagnostic information indicating one or more properties of the one or more host computing devices;

receiving installation information associated with the one or more host computing devices, the installation information comprising versions of software installed on the one or more host computing devices;

determining, by the one or more computer systems, one or more correlations between the one or more properties and the one or more errors based at least in part on the diagnostic information and the installation information;

determining one or more correlation strengths of the one or more correlations between the one or more properties and the one or more errors; and performing an action associated with the one or more host computing devices based on the one or more correlation strengths, the action relating to a modification to at least one of the one or more properties or the software installed on the one or more host computing devices.

15. The computer implemented method of claim 14, further comprising:

generating a notification to a user of the one or more host computing devices, the notification identifying at least one of the one or more correlations between the one or more properties and the one or more errors.

16. The computer implemented method of claim 14, wherein one or more correlation strengths are determined based at least in part on a statistical probability that the one or more host computing devices has both the one or more properties and the one or more errors.

17. The computer implemented method of claim 14, wherein one or more correlation strengths are determined based at least in part on whether the one or more properties change over a period of time.

18. The computer implemented method of claim 14, further comprising:

determine a first time of the one or more errors and a second time of the one or more properties, wherein the one or more correlation strengths are determined based at least in part upon a difference between the first time and the second time.

19. The computer implemented method of claim 14, wherein the one or more correlation strengths are determined based at least in part on a period of time during which the one or more errors and the one or more properties occurred.

20. The computer implemented method of claim 14, wherein the one or more correlation strengths are determined based at least in part on whether the one or more errors and the one or more properties were previously known to a multi-tenant environment, the multi-tenant environment comprising the one or more computer systems.

* * * * *